United States Patent
Wentink et al.

(10) Patent No.: US 9,661,634 B2
(45) Date of Patent: May 23, 2017

(54) SYSTEMS AND METHODS FOR IMPROVED COMMUNICATION EFFICIENCY IN HIGH EFFICIENCY WIRELESS NETWORKS

(71) Applicant: QUALCOMM Incorporated, San Diego, CA (US)

(72) Inventors: Maarten Menzo Wentink, Naarden (NL); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/525,822

(22) Filed: Oct. 28, 2014

(65) Prior Publication Data

US 2015/0124687 A1 May 7, 2015

Related U.S. Application Data

(60) Provisional application No. 61/899,028, filed on Nov. 1, 2013.

(51) Int. Cl.
*H04W 72/04* (2009.01)
*H04W 4/06* (2009.01)
(Continued)

(52) U.S. Cl.
CPC .......... *H04W 72/048* (2013.01); *H04W 4/06* (2013.01); *H04W 74/0816* (2013.01); *H04W 80/02* (2013.01)

(58) Field of Classification Search
CPC . H04W 72/048; H04W 72/0446; H04W 4/06; H04W 84/12; H04W 74/0816
(Continued)

(56) References Cited

U.S. PATENT DOCUMENTS 6,674,738 B1    1/2004  Yildiz et al.
6,873,627 B1    3/2005  Miller et al.
(Continued)

FOREIGN PATENT DOCUMENTS

KR    20100084141 A    7/2010
WO    WO-0122686 A1    3/2001
(Continued)

OTHER PUBLICATIONS

Asterjadhi A. et al., "Comment Resolution for Subclauses 9.3.2", IEEE P802.11 Wireless LANs; IEEE-SA Mentor, Piscataway, NJ USA, doc. IEEE 802.11-13.9715r1, Jul. 18, 2013 (Jul. 18, 2013), pp. 1-4, XP068054437.
(Continued)

*Primary Examiner* — Jamal Javaid
(74) *Attorney, Agent, or Firm* — Knobbe, Martens, Olson & Bear, LLP (57) ABSTRACT

Methods and apparatus for wireless communication are provided. In one aspect, a method for wireless communication includes generating a clear to send message comprising a specific medium access control address (MAC) identifiable by a first subset of a plurality of wireless devices as instructing not to update an associated network allocation vector according to a duration field in the clear to send message. The specific MAC address is not identifiable by a second subset of the plurality of wireless devices such that the second subset of the plurality of wireless devices are instructed to update an associated network allocation vector according to the duration field. The method further includes transmitting the message, thereby reserving wireless communication access for the first subset of the plurality of wireless devices. The specific MAC address is included in one or more address fields of a medium access control header of the message.

27 Claims, 4 Drawing Sheets

(51) Int. Cl.
*H04W 74/08* (2009.01)
*H04W 80/02* (2009.01)

(58) Field of Classification Search
USPC .................. 370/312, 329, 338, 311, 330
See application file for complete search history.

(56) References Cited

U.S. PATENT DOCUMENTS

| | | | |
|---|---|---|---|
| 7,426,395 B2 | 9/2008 | Stephens | |
| 7,583,649 B1 | 9/2009 | Bagchi | |
| 8,099,096 B2 | 1/2012 | Prakash et al. | |
| 8,848,561 B2 | 9/2014 | Siomina et al. | |
| 8,861,442 B2 | 10/2014 | Zhu et al. | |
| 2002/0172186 A1 | 11/2002 | Larsson | |
| 2004/0186907 A1* | 9/2004 | Wentink | H04W 74/085 709/225 |
| 2005/0089013 A1 | 4/2005 | Okagawa et al. | |
| 2005/0243843 A1 | 11/2005 | Imamura et al. | |
| 2006/0133286 A1 | 6/2006 | Elie-Dit-Cosaque et al. | |
| 2006/0165114 A1 | 7/2006 | Diepstraten et al. | |
| 2006/0194616 A1 | 8/2006 | Willins et al. | |
| 2006/0268715 A1 | 11/2006 | Zuniga et al. | |
| 2006/0268766 A1* | 11/2006 | Rangarajan | H04L 29/12028 370/328 |
| 2007/0110035 A1 | 5/2007 | Bennett | |
| 2007/0127428 A1* | 6/2007 | Lee | H04W 8/26 370/338 |
| 2007/0189168 A1 | 8/2007 | Yao | |
| 2007/0248034 A1 | 10/2007 | Hsu et al. | |
| 2008/0056211 A1 | 3/2008 | Kim et al. | |
| 2008/0232298 A1 | 9/2008 | Kim et al. | |
| 2008/0273700 A1 | 11/2008 | Wentink | |
| 2008/0316997 A1 | 12/2008 | Zeng et al. | |
| 2008/0317155 A1 | 12/2008 | Orfanos et al. | |
| 2009/0064244 A1 | 3/2009 | Shin et al. | |
| 2009/0290524 A1 | 11/2009 | Seok | |
| 2010/0142450 A1 | 6/2010 | Kangude et al. | |
| 2011/0199953 A1 | 8/2011 | Seok | |
| 2011/0280232 A1 | 11/2011 | Wu et al. | |
| 2011/0292897 A1 | 12/2011 | Wu et al. | |
| 2011/0317630 A1 | 12/2011 | Zhu et al. | |
| 2012/0076073 A1 | 3/2012 | Merlin et al. | |
| 2012/0099450 A1 | 4/2012 | Madan et al. | |
| 2012/0250617 A1 | 10/2012 | Wentink | |
| 2013/0148517 A1 | 6/2013 | Abraham et al. | |
| 2013/0184030 A1 | 7/2013 | Tavildar et al. | |
| 2013/0195081 A1 | 8/2013 | Merlin et al. | |
| 2014/0112266 A1 | 4/2014 | Seok | |
| 2014/0204872 A1 | 7/2014 | Yang et al. | |
| 2014/0307625 A1 | 10/2014 | Wentink | |
| 2015/0117365 A1 | 4/2015 | Merlin et al. | |
| 2015/0117366 A1 | 4/2015 | Stupar et al. | |
| 2015/0131530 A1 | 5/2015 | Wentink | |
| 2015/0181620 A1 | 6/2015 | Seok | |

FOREIGN PATENT DOCUMENTS

| | | |
|---|---|---|
| WO | WO-2006106450 A1 | 10/2006 |
| WO | WO-2007143739 | 12/2007 |
| WO | WO-2010017494 A1 | 2/2010 |

OTHER PUBLICATIONS

Ghosh C. et al., "Comment Collection 09 MAC CIDs (Comment Resolutions for CC09)", IEEE P802.11 Wireless LANs, IEEE-SA Mentor, Piscataway, NJ USA, doc.: IEEE P802.11-13/0813r0, Jul. 15, 2013 (Jul. 15, 2013), pp. 1-22, XP068054432.

Gong M.X. et al., "Directional CSMA/CA protocol with spatial reuse for mmWave wireless networks," IEEE Global Telecommunications Conference (GLOBECOM), Dec. 2010, pp. 1-5.

Hart B., et al., "GAPA—Efficient, More Reliable Multicast," IEEE 802.11-08/0533r2, IEEE mentor, May 12, 2008, pp. 1-13.

International Search Report and Written Opinion—PCT/US2014/062897—ISA/EPO—Jan. 29, 2015.

Kim J., et al., "GroupID Concept for Downlink MU-MIMO Transmission", IEEE 802.11-10/0073r1, [Online] Jan. 19, 2010, pp. 1-8.

Nishide K., et al., "Transport-level fairness provisioning in wireless local area networks with hidden stations", IEEE 20th International Symposium on Personal, Indoor and Mobile Radio Communications (PIMRC 2009), IEEE, Piscataway, NJ, USA, Sep. 13, 2009 (Sep. 13, 2009), pp. 1158-1162, XP031659609.

Park J., et al., "802.11ac MAC Frame Length Indication," IEEE 802.11-10/0358r0, IEEE mentor, Mar. 16, 2010, pp. 1-10.

Butti L., et al., "Discovering and exploiting 802.11 wireless driver vulnerabilities ", Journal in Computer Virology, vol. 4, No. 1, Sep. 29, 2007 (Sep. 29, 2007), pp. 25-37, XP002665765.

Giladi, Ran.; "Network Processors—Architecture, Programming, and Implementation", Jul. 16, 2008 (Jul. 16 2008), Morgan Kaufmann, ISBN: 978-0-12-370891-5, Chapter 5; Paragraph "5.4.1 Parsing"; p. 196.

Gross J, et al., "Enhancing IEEE 802.11a/n with dynamic single-user OFDM adaptation", Performance Evaluation, Amsterdam, NL, vol. 66, No. 3-5, Mar. 1, 2009 (Mar. 1, 2009), pp. 240-257, XP025923721.

IEEE 802.11; Part 11: Wireless LAN Medium Access Control (MAC) and Physical Layer (PHY) Specifications (Revision of IEEE STD 802-11-1999) (2007); pp. 1-914.

IEEE P802.11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput for Operation in Bands below 6 GHz, Jan. 2011, pp. 1-193.

"IEEE Standard for Information Technology-Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput" IEEE Standard, IEEE, Piscataway, NJ, USA, Oct. 29, 2009 (Oct. 29, 2009), pp. 1-502, XP017604244, ISBN: 978-0-7381-6046-7.

IEEE standards association, "Use of the IEEE assigned Organizationally Unique Identifier with ANSI/IEEE Std 802-2001 Local and Metropolitan Area Networks", Nov. 2, 2001, ANSI/IEEE STD 802-2001 Local and Metropolitan Area Networks Tutorial Rev.Nov. 2; 3 pages.

Jeong, K., et al., "Overlay Transmission System on Wireless LAN with RTS/CTS Exchange Taking into Account Timing Synchronization", IEICE Transactions on Communications, Communications Society, Tokyo, JP, vol. E93B, No. 3, Mar. 1, 2010 (Mar. 1, 2010), pp. 640-649, XP001555317.

Kamath, Vasudev: "Parsing the captured packets: Packet Sniffer", Apr. 29, 2009 (Apr. 29, 2009), [retrieved on Nov. 29, 2012]; 2 pages.

Kim J., et al., "GroupID Concept for Downlink MU-MIMO Transmission", IEEE 802.11-10/0073r2, IEEE mentor, Mar. 2010 Slide Show; pp. 1-10.

Morioka Y., et al., "Why we need Length Field in VHT SIG", IEEE 802.11-10/0627r00, IEEE mentor, pp. 1-12, May 17, 2010.

Sampath H., et al: "802.11 ac Preamble", Internet Citation, Jul. 13, 2010 (Jul. 13, 2010), pp. 1-18, XP002657958.

Ting, et al., "Design and Analysis of Grouping-Based DCF (GB-DCF) Scheme for the MAC layer Enhancement of 802.11 and 802.11n," Proceedings of the 9th ACM international symposium on Modeling analysis and simulation of wireless and mobile systems, 2006, pp. 255-264.

Van Nee, R., "Breaking the Gigabit-per-second barrier with 802.11AC", IEEE Wireless Communications, IEEE Service Center, Piscataway, NJ, US, vol. 18, No. 2, Apr. 1, 2011 (Apr. 1, 2011), p. 4, XP011354039.

Yun J-H., et al., "New Hidden Station Detection Scheme for Adaptive RTS/CTS Exchange in IEEE 802.11 WLANS", IEICE Transactions on Communications, Communications Society, Tokyo, JP, vol. E90B, No. 10, Oct. 1, 2007 (Oct. 1, 2007), pp. 2827-2835, XP001508611.

(56) References Cited

OTHER PUBLICATIONS

Zhang H et al., "802.11ac Preamble", IEEE 802.11-10/0070R0, [Online] Jan. 18, 2010 (Jan. 18, 2010), pp. 1-11, XP002610760.
Fischer M., et al., "Inter-bss-address-3-contents", IEEE 802.11-09/0401r2, IEEE mentor, Mar. 2009, 6 pages.
Ponnampalam V., et al., "11ac Auto-detection using the VHT-SIGA Field", IEEE 802.11-10/0750r1, IEEE mentor, Jul. 2010, 15 pages.

* cited by examiner

SYSTEMS AND METHODS FOR IMPROVED COMMUNICATION EFFICIENCY IN HIGH EFFICIENCY WIRELESS NETWORKS

Claim of Priority under 35 U.S.C. §119

The present Application for Patent claims priority to Provisional Application No. 61/899,028 entitled "SYSTEMS AND METHODS FOR IMPROVED COMMUNICATION EFFICIENCY IN HIGH EFFICIENCY WIRELESS NETWORKS" filed Nov. 1, 2013, and assigned to the assignee hereof. Provisional Application No. 61/899,028 is hereby expressly incorporated by reference herein.

BACKGROUND

Field

Certain aspects of the present disclosure generally relate to wireless communications, and more particularly, to methods and apparatus for selectively blocking communications in wireless networks.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The devices may communicate at different data rates. Where many devices share a communication network and there are large differences between the communication rates of the devices network, congestion and inefficient link usage may result. As such, systems, methods, and non-transitory computer-readable media are needed for improving communication efficiency in high efficiency wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises generating a clear to send message comprising a specific medium access control (MAC) address identifiable by a first subset of a plurality of wireless devices as instructing not to update an associated network allocation vector according to a duration field in the message. The specific MAC address is not identifiable by a second subset of the plurality of wireless devices such that the second subset are instructed to update an associated network allocation vector according to the duration field. The method further includes transmitting the message, thereby reserving wireless communication access for the first subset of the plurality of wireless devices.

Another aspect of the disclosure provides an apparatus for wireless communication. The apparatus comprises a processor configured to generate a clear to send message comprising a specific medium access control (MAC) address identifiable by a first subset of a plurality of wireless devices as instructing not to update an associated network allocation vector according to a duration field in the message. The specific MAC address is not identifiable by a second subset of the plurality of wireless devices such that the second subset are instructed to update an associated network allocation vector according to the duration field. The apparatus further comprises a transmitter configured to transmit the message, thereby reserving wireless communication access for the first subset of the plurality of wireless devices.

Another aspect of the disclosure provides a non-transitory computer-readable medium comprising code. The code, when executed, causes an apparatus to generate a clear to send message comprising a specific medium access control (MAC) address identifiable by a first subset of a plurality of wireless devices as instructing not to update an associated network allocation vector according to a duration field in the message. The specific MAC address is not identifiable by a second subset of the plurality of wireless devices such that the second subset are instructed to update an associated network allocation vector according to the duration field. The code, when executed, further causes the apparatus to transmit the message, thereby reserving wireless communication access for the first subset of the plurality of wireless devices.

Another aspect of the disclosure provides an apparatus for wireless communication. The apparatus comprises means for generating a clear to send message comprising a specific medium access control (MAC) address identifiable by a first subset of a plurality of wireless devices as instructing not to update an associated network allocation vector according to a duration field in the message. The specific MAC address is not identifiable by a second subset of the plurality of wireless devices such that the second subset are instructed to update an associated network allocation vector according to the duration field. The apparatus further comprises means for transmitting the message, thereby reserving wireless communication access for the first subset of the plurality of wireless devices.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Figure 1:
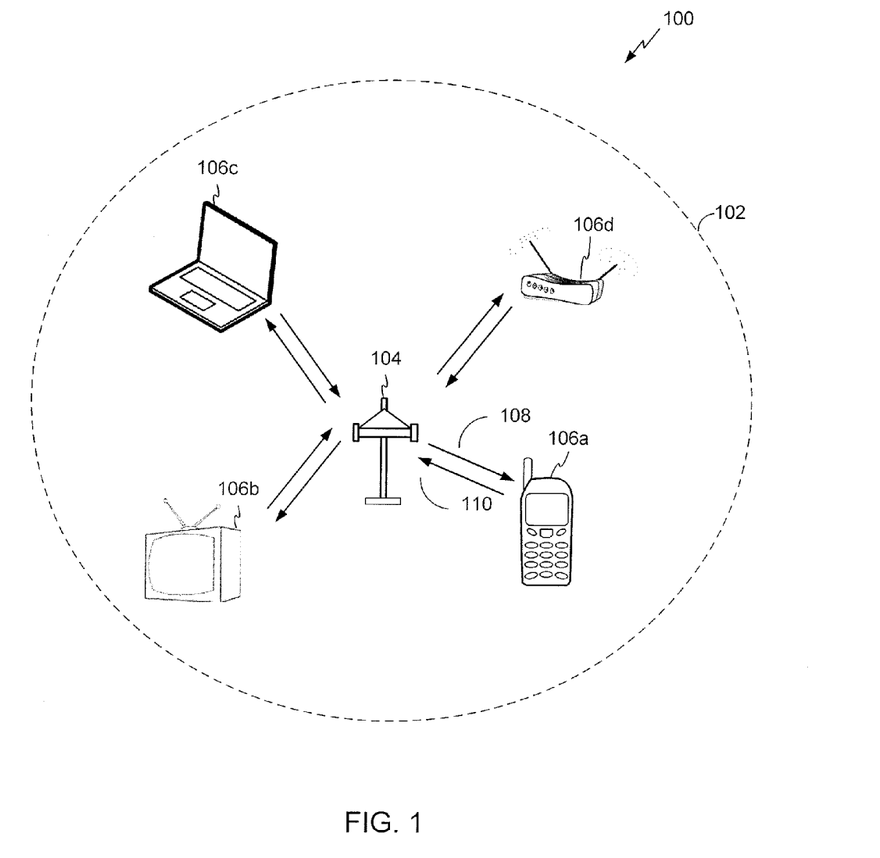
FIG. 1 illustrates an example of a wireless communication system in which aspects of the present disclosure may be employed.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with one or more of STA 106a, 106b, 106c, and/or 106d (collectively referred to as STAs 106 or STAs 106a-106d).

A variety of processes and methods may be used for transmissions in the wireless communication system 100 between the AP 104 and the STAs 106. For example, signals may be transmitted and received between the AP 104 and the STAs 106 in accordance with OFDM/OFDMA techniques. If this is the case, the wireless communication system 100 may be referred to as an OFDM/OFDMA system. Alternatively, signals may be transmitted and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
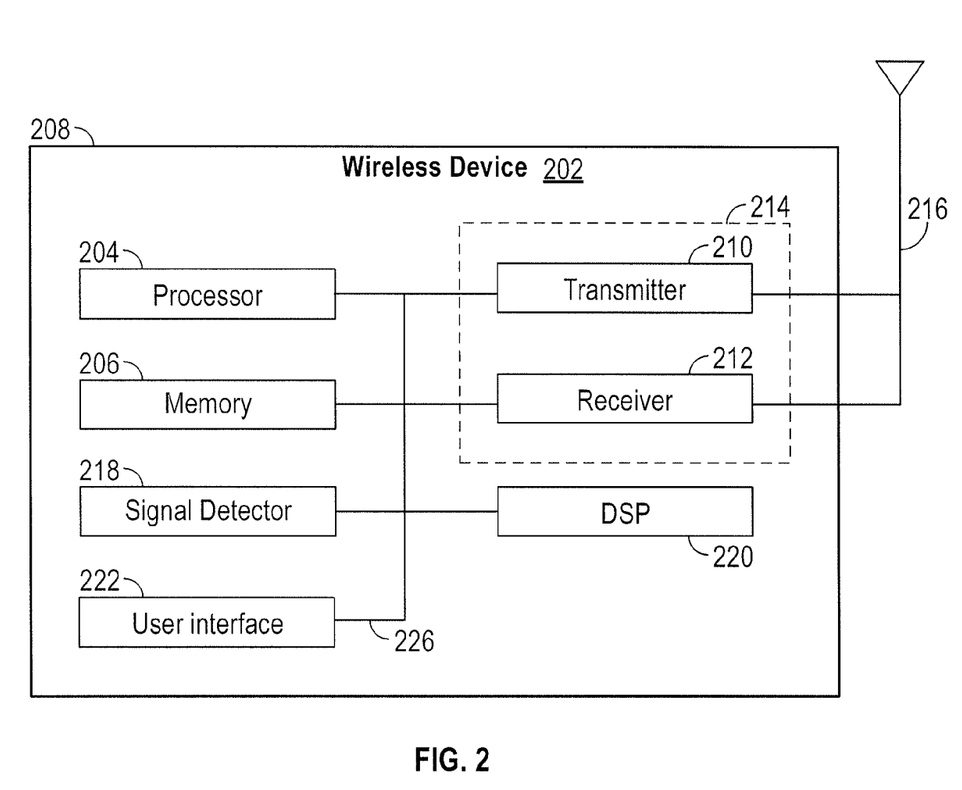
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. For example, the processor 204 may be configured to generate any of a plurality of types of frames and include a specific MAC address in one or more address fields of the frames, the specific MAC address identifiable by a first subset of a plurality of wireless devices and not by a second subset of the plurality of wireless devices, as will be described in connection with FIGS. 3-6 below. The processor 204 may include the specific MAC address by generating the address field(s) in which the specific MAC address is(are) located to include bits that may be processed and identified by a target receiving wireless device as indicating, identifying, corresponding to, or being associated with the specific MAC address.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or a STA 106, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Certain aspects of the present disclosure support allowing APs 104 to schedule STAs 106 transmissions in optimized ways to improve efficiency. Both high efficiency wireless (HEW) stations, stations utilizing an 802.11 high efficiency protocol, and stations using older or legacy 802.11 protocols, may compete for access to a wireless medium. The high-efficiency 802.11 protocol described herein may allow for devices to operate under a modified mechanism that differentiates between HEW devices that can identify a specific MAC address included in an 802.11 frame and selectively ignore an associated duration field in the 802.11 frame, and legacy devices that cannot. For example, with respect to FIG. 1, STAs 106a and 106b may be legacy STAs, while STAs 106c and 106d may be HEW STAs. In this embodiment, it may be desirable to silence the legacy STAs 106a and 106b so that the HEW STAs 160c and 106d may communicate with the AP 104 without interference from the legacy STAs 106a and 106b. One such implementation may utilize a clear to send (CTS) frame including a specific MAC address included in the address field. The HEW STAs may be capable of identifying the specific MAC address as instructing the HEW STAs to operate in accordance with one or more implementations described below. In such an implementation, with respect to FIG. 1, the STAs 106a and 106b may be operating in a mode according to a legacy IEEE 802.11 standard (i.e. IEEE 802.11b) and STAs 106c and 106d may be operating in a mode according to a IEEE 802.11 high efficiency protocol. Accordingly, in some implementations, the STAs 106c and 106d (e.g., the HEW STAs) may be configured to enter a special contention period for wireless communication access using a different wireless communication access scheme or a different set of channel access rules as compared to the STAs 106a and 106b (e.g., the legacy STAs). For example, in some implementations, the HEW STAs 106c and 106d may be configured to utilize backoff slots that have a length that is greater than a length of conventional backoff slots utilized by the legacy STAs 106a and 106b.

The specific MAC address may have the characteristic that it is associated with a protocol function rather than with a physical device. Such protocol functions or meanings associated with the specific MAC address may be defined by a standards body. The specific MAC address is thus not assigned to physical devices, but reserved for use in standards defined by the standards body, to indicate specific meaning to a frame that appears to be a normal frame for legacy devices. The specific MAC address may be an individual MAC address or a group MAC address. When the specific MAC address is an individual MAC address, it is guaranteed to be unique, because individual MAC addresses are administered by a single authority (the Institute of Electrics and Electronics Engineers Standards Association (IEEE-SA)). When the specific MAC address is a group MAC address, it may not be guaranteed to be unique, because group MAC addresses are not administered by a single authority, but they are free to use by any device. In an alternative, a wireless device transmitting a frame including the specific MAC address may assign a specific meaning to the specific MAC address by communicating, beforehand, the meaning and the specific MAC address to the associated wireless devices in a management frame exchange or via a beacon frame. Furthermore, some implementations may contemplate different specific MAC addresses, each assigned to a corresponding one of the different wireless communication access schemes. In this way, the specific MAC address may be utilized to demarcate the start of a special contention period for the HEW STAs, for example.

Figure 3:
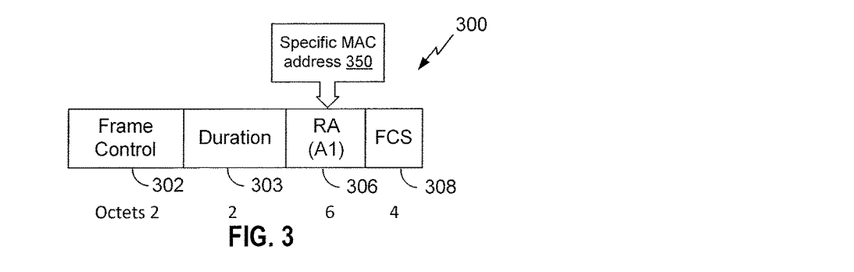
FIG. 3 illustrates an example of a clear to send (CTS) frame.

FIG. 3 illustrates an example of a clear to send (CTS) frame. The CTS frame 300 may be transmitted by a device to reserve a channel for communication. The CTS frame 300 includes 4 different fields: a frame control (FC) field 302, a duration field 304, a receiver address (RA) field 306 (also referred to as a receiver address (a1)), and a frame check sequence (FCS) field 308. FIG. 3 further indicates the size in octets of each of the fields 302, 304, 306 and 308 as 2, 2, 6 and 4, respectively. The RA field 306 includes a full MAC address of a device, which is a 48-bit (6 octet) value. For a CTS frame the MAC address in the RA field 306 would typically correspond to the device the CTS frame is intended to be received by. Under conventional operation, all devices to which the CTS frame 300 is not addressed and that are able to decode the CTS frame 300, will silence themselves for the duration indicated in the duration field 304 by updating their network allocation vector (NAV) according to the value in the duration field 304.

However, according to some implementations, the RA field 306 may include a specific MAC address 350 that the HEW STAs, for example STAs 106c and 106d shown in FIG. 1, are specifically configured to identify as instructing the HEW STAs not to update their respective network allocation vectors (NAVs) according to a value in the duration field 304. Thus, the HEW STAs will not be silenced by receiving the CTS frame 300. However, because the legacy STAs 106a and 106b are not configured to identify the specific MAC address 350 in the RA field 306, the legacy STAs will be instructed, by receiving the CTS frame 300, to update their NAVs according to the value in the duration field 304. This is because the specific MAC address 350 in the RA field 306 does not match the MAC address associated with any of the legacy STAs. The duration field of the CTS frame 300 may be set such that a predetermined percentage of a total communication time is reserved for the STAs 106c and 106d to communicate. In this way, wireless communication access may be reserved for communication by the HEW STAs. As such, during the time the NAVs for the legacy STAs are set to silence the legacy STAs, the HEW STAs may enter a special contention period for wireless communication access using a different wireless communication access scheme or a different set of channel access rules than those governing the operation of the legacy STAs.

Figure 4:
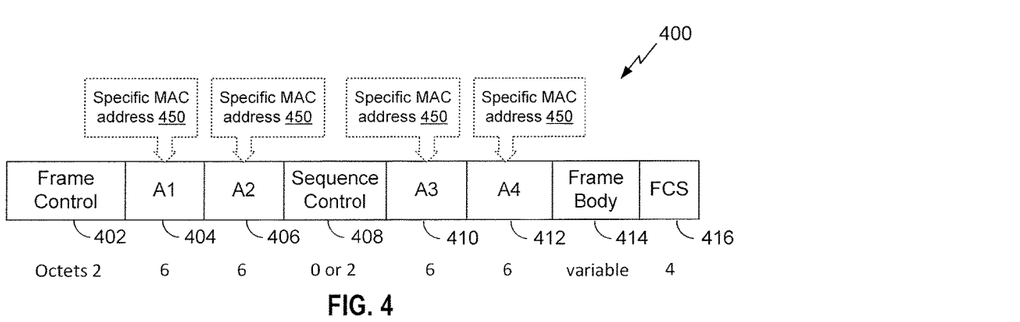
FIG. 4 illustrates an example of a MAC header frame.

In some aspects, the AP 104 or one of the STAs 106 may transmit a frame where the specific MAC address is located in one or more other address fields within the MAC header of the frame, as shown in more detail in connection with FIG. 4 below. FIG. 4 illustrates an example of a MAC header frame. The MAC header frame 400 may be transmitted by a device to reserve a channel for communication. The MAC header frame 400 may include 8 fields: a frame control (FC) field 402, a receiver address A1 field 404, a transmitter address A2 field 406, a sequence control field 408, an address A3 field 410, an address A4 field 412, a frame body field 414, and a frame check sequence (FCS) field 416. FIG. 4 further indicates the potential size in octets of each of the fields 402, 404, 406, 408, 410, 412, 414 and 416 as 2, 6, 6, 0 or 2, 6, 6, variable, and 4, respectively. The receiver address A1 field 404 is typically utilized for indicating the MAC address of the receiving device for the frame 400. The transmitter address A2 field 406 is typically utilized for indicating the MAC address of the transmitting device of the frame 400. The address A3 field 410 is typically utilized for indicating the MAC address of the source device or destination device for the frame 400. The address A4 field 412 is typically utilized for indicating the MAC address of the source device or destination device of the frame 400 on a bridge link.

Similar to the implementations described in connection with FIG. 3 above, the specific MAC address 450 may be included in any of the receiver address A1 field 404, the transmitter address A2 field 406, the address A3 field 410, and the address A4 field. The multiple specific MAC address 450 blocks are shown having dotted lines merely to indicate that the specific MAC address 450 may be included in one or more of the indicated fields. As previously described, the HEW STAs, for example STAs 106c and 106d shown in FIG. 1, are specifically configured to identify the specific MAC address 450 in any of the above-mentioned receiver address fields as instructing the HEW STAs not to update their respective network allocation vectors (NAVs) according to a value in a duration field. Thus, the HEW STAs will not be silenced. However, because the legacy STAs, for example the STAs 106a and 106b, are not configured to identify the specific MAC address 450, the legacy STAs will instead be instructed to update their NAVs according to the value in the duration field. In this way, wireless communication access medium may be reserved for communication by the HEW STAs.

Figure 5:
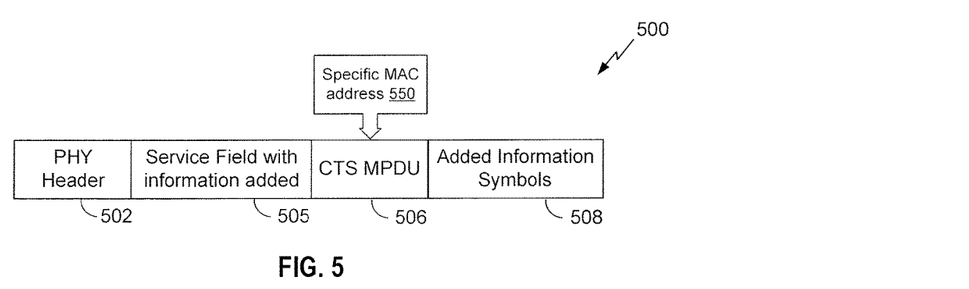
FIG. 5 illustrates an example of a CTS frame indicating information added to one or more fields.

In some implementations, the presence of the specific MAC address may additionally be utilized to instruct wireless devices configured to correctly identify the specific MAC address that additional information is located in the frame, as described in more detail in connection with FIG. 5 below. Here, instructing the wireless devices configured to correctly identify the specific MAC address may mean that upon correctly identifying the specific MAC address in a received frame, the wireless devices may automatically search for the additional information in, or parse the additional information from, particular fields as described below. FIG. 5 illustrates an example of a CTS frame 500 indicating information added to one or more fields. For example, the CTS frame 500 may include a PHY header 502, a service field 505, a CTS MAC service data unit (MPDU) 506 and, optionally, a field 508. In one implementation, the presence of the specific MAC address 550 in an address field (not specifically shown in FIG. 5) of the CTS MDPU 506 may instruct the HEW STAs 106c and 106d of FIG. 1, that additional information is located in the CTS frame 500. For example, the additional information may be present in the service field 505. In addition, or in the alternative, the additional information may be present in field 508, after the CTS MPDU 506, in the form of one or more data symbols.

Figure 6:
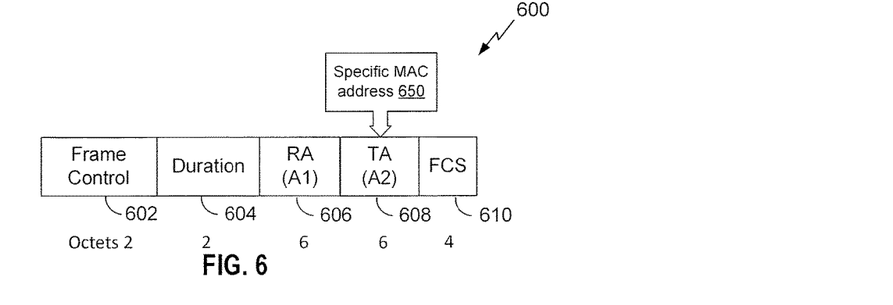
FIG. 6 illustrates an example of a request to send (RTS) frame.

Similar to its use in CTS frames, the specific MAC address 550 may additionally be included in a request to send (RTS) frame, as described in more detail in connection with FIG. 6 below. FIG. 6 illustrates an example of a request to send (RTS) frame. The RTS frame 600 includes 5 different fields: a frame control (FC) field 602, a duration field 604, a receiver address (RA) field 606 (also referred to as a receiver address (a1)), a transmitter address (TA) field 608 (also referred to as an address (a2)), and a frame check sequence (FCS) field 610. FIG. 6 further indicates the size in octets of each of the fields 602, 604, 606, 608 and 610 as 2, 2, 6, 6 and 4, respectively. Both of the RA field 606 and the TA field 608 include a full MAC address of a device, which is a 48-bit (6 octet) value. For an RTS frame, the MAC address in the RA field 606 would typically correspond to the device receiving the RTS frame 600, while the TA field 608 would typically correspond to the device transmitting the RTS frame 600. In some implementations, the specific MAC address 650 can also be included in the TA field (a2 field) 608. In such a case, the RTS frame 600 appears to have been transmitted by a device with the specific MAC address 650. The RA field 608 may be set to a unicast MAC address of the receiving STA. In an RTS/CTS exchange, the RA (a1) address of the CTS is copied from the TA (a2) address of the RTS frame 600, which implies that the specific MAC address 650 will be copied into the CTS frame when it was present in the TA (a2) field 608 of the RTS frame 600. The presence of the specific MAC address 650 in the TA (a2) field 608 of the RTS frame 600 may indicate a special meaning of the RTS frame 600 for the HEW STAs 106c and 106d, while the legacy STAs 106a and 106b will parse the RTS frame 600 as a regular RTS frame. Thus, both the RTS and the CTS in the RTS/CTS exchange will be interpreted according to the special meaning by HEW STAs that received the RTS and/or the CTS, because the specific MAC address 650 was present in both the RTS and the CTS, while legacy STAs will update their NAV according to the value in the duration field of the received RTS and/or CTS, because the legacy STAs do not recognize the specific MAC address 650. The general rule is that a receiver that recognizes a specific MAC address included in any one of the address fields present in a received frame parses the frame according to the rules specified for the specific MAC address (by the standard or by a peer device).

In some implementations, it may be desirable to define new control frames which carry information not present in legacy control frames, yet the new control frames are still processed by legacy wireless devices as legacy control frames would be. One such solution may include associating both a first MAC address and a second MAC address to a particular wireless device. When a frame including the first MAC address is received by the particular wireless device, the particular wireless device may process the frame according to a first standard, for example the 802.11b standard. However, when a frame including the second MAC address is received by the particular wireless device, the particular wireless device may process the frame according to a second standard, for example, 802.11ac. In such a case, the frame including the second MAC address may be parsed differently than the frame including the first MAC address. In one implementation, the first MAC address may be the address provided for address resolution purposes, for example when the address is requested for using the Address Resolution Protocol (ARP). In such an implementation, the first MAC address may be used as the source address (SA) on any transmission. In another implementation, the first MAC address may be utilized for data frames, while the second MAC address is utilized for control frames. The second MAC address may be communicated explicitly in a management frame, for example, as an information element within the management frame.

In some implementations, such a second MAC address may be derived from the first MAC address through a predefined rule. For example, the second MAC address may be formed by setting the Individual/Group (I/G) address bit of the first MAC address to 1, so that the second MAC address is the group MAC address version of the first MAC address. In another implementation, the second MAC address may be formed by setting the Universally/Locally (U/L) Administered address bit of the first MAC address to 1, so that the second MAC address is the locally administered version of the first MAC address. In yet another implementation, the second MAC address may be formed by setting both the I/G bit and the U/L bit of the first MAC address to 1, so that the second MAC address is the locally administered group MAC address version of the first MAC address. In yet another implementation, the second MAC address may be formed by flipping the least significant address bit of the first MAC address, thus indicating that the particular wireless device has two globally administered MAC addresses. In yet another implementation, the second MAC address may be formed by flipping a predetermined bit of the first MAC address. For example, the least significant address bit, or some other predetermined address bit, of the second MAC address may be set to 1, with the convention that the first MAC address always has the least significant bit, or the other predetermined address bit, set to 0. Alternatively, the second MAC address may be formed by setting the least significant address bit, or some other predetermined address bit, to 0, with the convention that the first MAC address always has the least significant bit, or the other predetermined address bit, set to 1.

Figure 7:
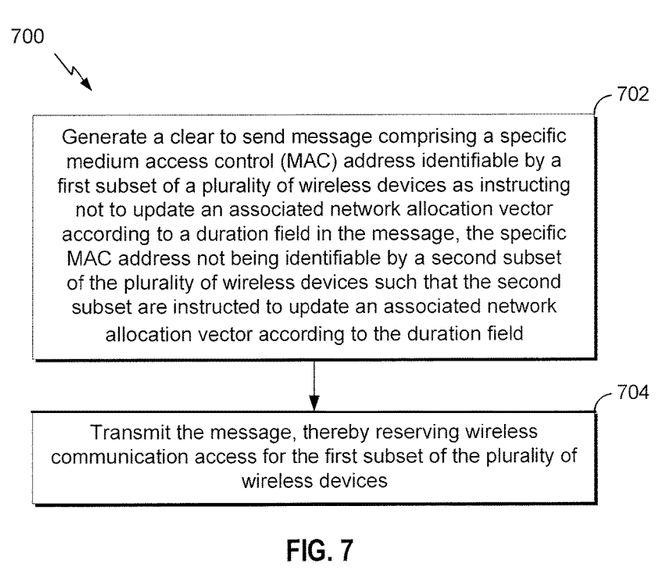
FIG. 7 is a flow chart of an aspect of an exemplary method for providing wireless communication.

FIG. 7 is a flow chart of an exemplary method 700 for wireless communication in accordance with certain embodiments described herein. The messages may be transmitted by the AP 104 to one or more of the STAs 106a-106d shown in FIG. 1. In addition, the wireless device 202 shown in FIG. 2 may represent a more detailed view of the AP 104, as described above. Thus, in one implementation, one or more of the steps in flowchart 700 may be performed by, or in connection with, a processor and/or transmitter, such as the processor 204 and transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

In operation block 702, the AP 104 or a STA 106 may generate a clear to send (CTS) message comprising a specific medium access control (MAC) address identifiable by a first subset of a plurality of wireless devices as instructing not to update an associated network allocation vector (NAV) according to a duration field in the message. The specific MAC address is not identifiable by a second subset of the plurality of wireless devices such that the second subset of the plurality of wireless devices are instructed to update an associated network allocation vector according to the duration field. For example, with respect to FIG. 1, the AP 104 may generate a CTS message and may include a specific MAC address in one or more address fields, as previously described in connection with FIGS. 3-6, such that at least the STAs 106c and 106d may identify the specific MAC address as instructing the STAs 106c and 106d not to update an associated NAV according to a duration field in the CTS message. Because the specific MAC address is not identifiable by at least the STAs 106a and 106b as it is by the STAs 106c and 106d, the STAs 106a and 106b will be conventionally instructed to update their associated NAVs according to the duration field in the CTS message. In such an implementation, once the CTS message is transmitted by the AP 104 and received by the STAs 106, at least the STAs 106a and 106b may be silenced for the duration of the CTS message, thus reserving wireless communication access for at least the STAs 106c and 106d.

In operation block 704, the AP 104 or a STA 106 may transmit the message, thereby reserving wireless communication access for the first subset of the plurality of wireless devices. For example, as described above, because the STAs 106c and 106d are instructed to not update their NAVs the STAs 106c and 106d will not be silenced, while the STAs 106a and 106b, being legacy devices, will update their NAVs and be silent for the duration of the CTS message, thus reserving wireless communication access for at least the STAs 106c and 106d.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of wireless communication in a network, comprising:

generating a clear to send message comprising a specific medium access control (MAC) address identifiable by a first subset of a plurality of wireless devices in the network as instructing not to update an associated network allocation vector according to a duration field in the message, the specific MAC address not being identifiable by a second subset of the plurality of wireless devices in the network such that the second subset are instructed to update an associated network allocation vector according to the duration field, wherein the specific MAC address is not associated with the plurality of wireless devices in the network; and transmitting the message, thereby reserving wireless communication access independent of data priority for the first subset of the plurality of wireless devices.

2. The method of claim 1, wherein the specific MAC address is included in a receiver address field of a medium access control header of the message.

3. The method of claim 1, wherein the specific MAC address is included in a transmitter address field of a medium access control header of the message.

4. The method of claim 1, wherein the specific MAC address is included in at least one of a source address field and a destination address field of a medium access control header of the message.

5. The method of claim 1, wherein the specific MAC address is one of a multicast MAC address or a locally administered MAC address.

6. The method of claim 1, wherein identifying the specific MAC address in the message further instructs the first subset of the plurality of wireless devices that additional information is located in a service field of a physical layer header of the message.

7. The method of claim 1, further comprising transmitting at least one management frame to at least the first subset of the plurality of wireless devices, the management frame comprising the specific MAC address and one or more instructions associated with the specific MAC address.

8. The method of claim 1, wherein the specific MAC address is further identifiable by the first subset of the plurality of wireless devices as instructing the use of a wireless communication access scheme associated with the specific MAC address.

9. The method of claim 8, wherein the wireless communication access scheme utilizes backoff slots having a length greater than a length of backoff slots utilized by the second subset of the plurality of wireless devices.

10. An apparatus for wireless communication in a network, comprising:
a processor configured to generate a clear to send message comprising a specific medium access control (MAC) address identifiable by a first subset of a plurality of wireless devices in the network as instructing not to update an associated network allocation vector according to a duration field in the message, the specific MAC address not being identifiable by a second subset of the plurality of wireless devices in the network such that the second subset are instructed to update an associated network allocation vector according to the duration field, wherein the specific MAC address is not associated with the plurality of wireless devices in the network; and
a transmitter configured to transmit the message, thereby reserving wireless communication access independent of data priority for the first subset of the plurality of wireless devices.

11. The apparatus of claim 10, wherein the processor is further configured to include the specific MAC address in a receiver address field of a medium access control header of the message.

12. The apparatus of claim 10, wherein the processor is further configured to include the specific MAC address in a transmitter address field of a medium access control header of the message.

13. The apparatus of claim 10, wherein the processor is further configured to include the specific MAC address in at least one of a source address field and a destination address field of a medium access control header of the message.

14. The apparatus of claim 10, the address comprising one of a multicast MAC address or a locally administered MAC address.

15. The apparatus of claim 10, wherein the processor is further configured to include additional information in a service field of a physical layer header of the message.

16. The apparatus of claim 10, wherein the transmitter is further configured to transmit at least one management frame to at least the first subset of the plurality of wireless devices, the management frame comprising the specific MAC address and one or more instructions associated with the specific MAC address.

17. The apparatus of claim 10, wherein the specific MAC address is further identifiable by the first subset of the plurality of wireless devices as instructing the use of a wireless communication access scheme associated with the specific MAC address.

18. The apparatus of claim 17, wherein the wireless communication access scheme utilizes backoff slots having a length greater than a length of backoff slots utilized by the second subset of the plurality of wireless devices.

19. A non-transitory computer-readable medium comprising code that, when executed, causes an apparatus to:
generate a clear to send message comprising a specific medium access control (MAC) address identifiable by a first subset of a plurality of wireless devices in a network as instructing not to update an associated network allocation vector according to a duration field in the message, the specific MAC address not being identifiable by a second subset of the plurality of wireless devices in the network such that the second subset are instructed to update an associated network allocation vector according to the duration field, wherein the specific MAC address is not associated with the plurality of wireless devices in the network; and
transmit the message, thereby reserving wireless communication access independent of data priority for the first subset of the plurality of wireless devices.

20. The non-transitory computer-readable medium of claim 19, wherein the specific MAC address is included in a receiver address field of a medium access control header of the message.

21. The non-transitory computer-readable medium of claim 19, wherein the specific MAC address is included in a transmitter address field of a medium access control header of the message.

22. The non-transitory computer-readable medium of claim 19, wherein the specific MAC address is included in at least one of a source address field and a destination address field of a medium access control header of the message.

23. The non-transitory computer-readable medium of claim 19, wherein the specific MAC address is one of a multicast MAC address or a locally administered MAC address.

24. The non-transitory computer-readable medium of claim 19, wherein identifying the specific MAC address in the message further instructs the first subset of the plurality of wireless devices that additional information is located in a service field of a physical layer header of the message.

25. The non-transitory computer-readable medium of claim 19, the medium further comprising code that, when executed, causes the apparatus to transmit at least one management frame to at least the first subset of the plurality of wireless devices, the management frame comprising the specific MAC address and one or more instructions associated with the specific MAC address.

26. The non-transitory computer-readable medium of claim 19, wherein the specific MAC address is further identifiable by the first subset of the plurality of wireless devices as instructing the use a wireless communication access scheme associated with the specific MAC address.

27. The non-transitory computer-readable medium of claim 26, wherein the wireless communication access scheme utilizes backoff slots having a length greater than a length of backoff slots utilized by the second subset of the plurality of wireless devices.

* * * * *